H. POE.
Gage-Cock.

No. 219,759.  Patented Sept. 16, 1879.

ATTEST:
Walter Allen
Walter O. Guy

INVENTOR:
Hamilton Poe
By Knight Bros.
Attorneys

UNITED STATES PATENT OFFICE.

HAMILTON POE, OF ST. LOUIS, MISSOURI.

IMPROVEMENT IN GAGE-COCKS.

Specification forming part of Letters Patent No. 219,759, dated September 16, 1879; application filed July 14, 1879.

*To all whom it may concern:*

Be it known that I, HAMILTON POE, of the city of St. Louis, in the State of Missouri, have invented a certain new and useful Improvement in Gage-Cocks, of which the following is a full, clear, and exact description, reference being had to the accompanying drawings, forming part of this specification.

My improvement consists in making an enlarged portion to the body of the cock in which the valve works, this portion being screw-threaded to receive a hollow portion, through which the hollow valve-stem passes. The valve-stem is made screw-threaded, and has passing through it a valve-rod having on its inner end a head, which is pressed against packing to make the valve-seat steam-tight by means of a hand-wheel on its outer end. The valve-stem has a socket attached to its inner end, which surrounds the packing.

Figure 1:
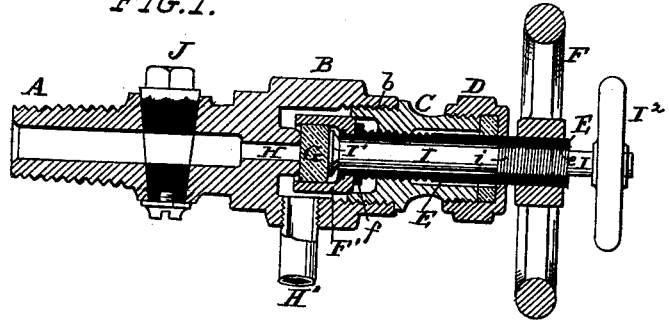
Figure 2:
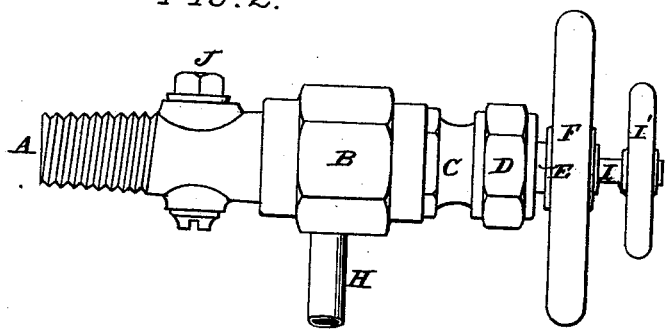

In the drawings, Figure 1 is a longitudinal section, and Fig. 2 is a side view.

A is the stem of the cock. B is an enlarged portion, which is made screw-threaded (preferably upon the inside) at $b$, to receive the hollow portion C, which has upon it a cap, D. The hollow portion C is screw-threaded upon its inside, into which screws a valve-stem, E, which has upon its outer end a hand-wheel, F, and upon its inner end a socket, F', held in place upon the valve-stem by collar $f$, and which surrounds a packing of rubber or other suitable material, G. The valve-stem E has steam-tight connection with the cap D.

H is a small pipe or steam-orifice, arranged to form a valve-seat.

I is a valve-rod, screw-threaded at $i$, working in the screw-threaded portion $e$ of the valve-stem E. This valve-rod has upon its inner end a head, $I^1$, which is in contact with the packing G, and upon its outer end a hand-wheel, $I^2$.

The opening and closing of the valve are effected by turning the valve-stem E by means of the hand-wheel F, which carries with it the valve-rod I and packing G.

Whenever the inner end of the packing becomes worn away it may be pressed forward or fed up to its seat by screwing in the valve-rod I, which is used only for this purpose.

J is a stop-cock, situated between the valve and the boiler, to shut off the steam, when desired, either for renewing the packing (which may be done by unscrewing the portion C from that B) or for any other purpose.

K is a steam-outlet pipe of common construction.

I claim as my invention—

1. The combination of stem or body A, enlarged portion B, hollow portion C, cap D, valve-stem E, removable socket F, collar $f$, and packing G, all substantially as set forth.

2. The combination of stem A, enlarged portion B, hollow portion C, cap D, valve stem E, socket F', packing G, and valve-rod I, substantially as set forth.

3. The combination of body A B C D, valve-stem E, socket F', packing G, valve-rod I, steam-outlet pipe K, and shut-off cock J, all arranged substantially as and for the purpose set forth.

In testimony whereof I have hereunto set my hand this 5th day of July, 1879.

HAMILTON POE.

Witnesses:
   GEO. H. KNIGHT,
   GEO. D. KNIGHT.